United States Patent
Disori et al.

(10) Patent No.: US 12,480,721 B2
(45) Date of Patent: *Nov. 25, 2025

(54) CAST PLATE HEAT EXCHANGER AND METHOD OF MAKING USING DIRECTIONAL SOLIDIFICATION

(71) Applicant: RTX CORPORATION, Farmington, CT (US)

(72) Inventors: Michael A. Disori, Glastonbury, CT (US); Steven J. Bullied, Pomfret Center, CT (US); Ryan C. Breneman, West Hartford, CT (US); John Marcin, Marlborough, CT (US); David J. Hyland, Portland, CT (US); William P. Stillman, Sturbridge, MA (US); Carl R. Verner, Windsor, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/385,635

(22) Filed: Oct. 31, 2023

(65) Prior Publication Data

US 2024/0060728 A1    Feb. 22, 2024

Related U.S. Application Data

(63) Continuation of application No. 16/271,267, filed on Feb. 8, 2019, now Pat. No. 11,808,529.

(Continued)

(51) Int. Cl.
*F28F 1/26*    (2006.01)
*B22D 27/04*   (2006.01)

(52) U.S. Cl.
CPC .............. *F28F 1/26* (2013.01); *B22D 27/045* (2013.01)

(58) Field of Classification Search
CPC ...... F28F 1/26; F28F 3/02; F28F 1/122; F28F 1/124; F28F 1/28; F28F 2009/0292;
(Continued)

(56) References Cited

U.S. PATENT DOCUMENTS 5,937,517 A    8/1999   Smith et al.
6,009,938 A    1/2000   Smith et al.
(Continued)

FOREIGN PATENT DOCUMENTS

EP    1724372 A1    11/2006
EP    2725308 A1    4/2014
EP    3537084 A2    9/2019

OTHER PUBLICATIONS

European Search Report for European Application No. 19164115.8 mailed Jan. 28, 2020.

(Continued)

*Primary Examiner* — Gordon A Jones
(74) *Attorney, Agent, or Firm* — Carlson, Gaskey & Olds, P.C.

(57) ABSTRACT

A cast part includes an outermost wall, at least one inner wall defining at least two internal passages and at least one cast cooling fin extending from an outer surface. The cast part including a cross-sectional circular area spanning at least a portion of each of four internal passages includes a ratio of interior empty space to inner wall space that improves heat transfer.

11 Claims, 9 Drawing Sheets

Related U.S. Application Data (60) Provisional application No. 62/647,066, filed on Mar. 23, 2018.

(58) Field of Classification Search
CPC .. F28F 2215/00; B22D 27/045; H01L 23/467; H01L 23/367; H01J 2235/1283; H01J 2229/0092
See application file for complete search history.

(56) References Cited

U.S. PATENT DOCUMENTS

| | | | |
|---|---|---|---|
| 8,851,152 B2 | 10/2014 | Frasier et al. | |
| 9,315,663 B2 | 4/2016 | Appleby et al. | |
| 9,545,664 B2 | 1/2017 | Bullied et al. | |
| 11,808,529 B2 * | 11/2023 | Disori | F28F 1/26 |
| 2001/0040025 A1 * | 11/2001 | Jurisich | F28F 3/048 |
| | | | 165/166 |
| 2004/0251013 A1 | 12/2004 | Kawakubo et al. | |
| 2006/0118282 A1 | 6/2006 | Ren et al. | |
| 2007/0131396 A1 | 6/2007 | Yu et al. | |
| 2009/0065183 A1 | 3/2009 | Uneno | |
| 2011/0001169 A1 | 1/2011 | Ozcan et al. | |
| 2013/0292094 A1 | 11/2013 | Omori et al. | |
| 2014/0093387 A1 | 4/2014 | Pointon et al. | |
| 2017/0051986 A1 | 2/2017 | Jocham et al. | |
| 2019/0021186 A1 | 1/2019 | Poltorak | |
| 2020/0404807 A1 | 12/2020 | Hung et al. | |

OTHER PUBLICATIONS

Partial European Search Report for European Application No. 19164115.8 mailed Sep. 17, 2019.

European Search Report for European Application No. 24151045.2 mailed Feb. 13, 2024.

\* cited by examiner

CAST PLATE HEAT EXCHANGER AND METHOD OF MAKING USING DIRECTIONAL SOLIDIFICATION

CROSS-REFERENCE TO RELATED APPLICATION

This application is a continuation of U.S. patent application Ser. No. 16/271,267 filed Feb. 8, 2019 which claims priority to U.S. Provisional Application No. 62/647,066 filed on Mar. 23, 2018.

BACKGROUND

A plate fin heat exchanger includes adjacent flow paths that transfer heat from a hot flow to a cooling flow. The flow paths are defined by a combination of plates and fins that are arranged to transfer heat from one flow to another flow. The plates and fins are created from sheet metal material brazed together to define the different flow paths. Thermal gradients present in the sheet material create stresses that can be very high in certain locations. The stresses are typically largest in one corner where the hot side flow first meets the coldest portion of the cooling flow. In an opposite corner where the coldest hot side flow meets the hottest cold side flow the temperature difference is much less resulting in unbalanced stresses across the heat exchanger structure. Increasing temperatures and pressures can result in stresses on the structure that can exceed material and assembly capabilities.

Turbine engine manufactures utilize heat exchangers throughout the engine to cool and condition airflow for cooling and other operational needs. Improvements to turbine engines have enabled increases in operational temperatures and pressures. The increases in temperatures and pressures improve engine efficiency but also increase demands on all engine components including heat exchangers. Existing heat exchangers are a bottleneck in making system-wide efficiency improvements because they do not have adequate characteristics to withstand increased demands. Improved heat exchanger designs can require alternate construction techniques that can present challenges to the feasible practicality of implementation.

Conventionally, cast parts, such as turbine blades only seek to maximize heat transfer from a cold side to a hot side, but not in both directions like the present invention. Prior to the current invention, conventional casting was generally only applied to parts like turbine blades which were exposed to the most extreme forces and temperatures. Designing a part which seeks to maximize heat transfer in both directions between hot and cold sides would include much more densely packed features than a turbine conventionally required. Thus, casting has not been used for such purposes because of its expense and the difficulty to make it work for something like a heat exchanger.

Turbine engine manufacturers continue to seek further improvements to engine performance including improvements to thermal, transfer and propulsive efficiencies.

SUMMARY

In a featured embodiment, a cast plate includes an outermost wall, at least one inner wall defining at least two internal passages, and at least one cast cooling fin extending from an outer surface, wherein the cooling fin includes a ratio of fin height to an average fin thickness that is greater than 2.0 and no more than 18.0.

In another embodiment according to the previous embodiment, the cooling fin includes a ratio of fin height to an average fin thickness that is greater than 3.5 and no more than 12.0.

In another embodiment according to any of the previous embodiments including at least a first plate portion separated by an open space from a second plate portion, wherein each of the first plate portion and the second plate portion include at least one cast cooling fin that extends into the open space In another embodiment according to any of the previous embodiments, at least one cast cooling fin extends from an outer surface. The cooling fin includes a ratio of fin height to an average fin thickness that is greater than 3.5 and no more than 12.0.

In another embodiment according to the previous embodiment, a ratio of a first distance between outer surfaces of the first plate portion and the second plate portion bounding the open space and a second distance between a tip of at least one cast cooling fin is greater than 2.5 and no more than 4.5.

In another embodiment according to any of the previous embodiments, the ratio of the first distance to the second distance is greater than 3.25 and no more than 3.75.

In another embodiment according to any of the previous embodiments, at least one fin includes a fin thickness that varies in a direction from a fin base toward a fin tip according to an angle from a plane normal to the outer surface that is greater than 0 and no more than 4 degrees.

In another embodiment according to any of the previous embodiments, at least one plate portion wherein the outer surface includes a top surface and a bottom surface and a plurality of cast cooling fins extend from both the top surface and the bottom surface.

In another embodiment according to any of the previous embodiments, the inner wall includes a thickness not including localized surface features that is substantially constant between an inlet and an outlet for each of the at least two internal passages.

In another embodiment according to any of the previous embodiments, the thickness of the inner wall is between 0.005 and 0.060 inches.

In another embodiment according to any of the previous embodiments, the cast part includes a heat exchanger with at least two plate portions separated by an open space, with each of the plate portions including a top surface, a bottom surface a leading edge, a trailing edge, and a plurality of cast fin portions extending from the leading edge to the trailing edge on both the top surface and the bottom surface.

In another embodiment according to any of the previous embodiments, the cast part is formed from one of a metal material and a nickel alloy material.

In another featured embodiment, a cast part includes an outermost wall a first a first inner wall, second inner wall and a third inner wall defining at least four internal passages. Any cross-sectional circular area spanning at least a portion of each of said for internal passages includes a ratio of interior empty space to inner wall space that is greater than zero and no greater than 3.6.

In another embodiment according to any of the previous embodiments, at least one cast cooling fin, wherein the cooling fin includes a ratio of fin height to an average fin thickness that is greater than 2.0 and no more than 18.0.

In another embodiment according to any of the previous embodiments, at least a first plate portion is separated by an open space from a second plate portion. The first plate portion includes at least one first cast fin portion extending into the open space and the second plate portion include at least one second cast cooling fin extending into the open space.

In another embodiment according to any of the previous embodiments, a ratio of a first distance between outer surfaces of the first plate portion and the second plate portion bounding the open space and a second distance between a tip of at least one of the first cast fin portion and the second cast fin portion and an opposing outer surface is greater than 2.5 and no more than 4.5.

In another embodiment according to any of the previous embodiments, at least one fin includes a fin thickness that varies in a direction from a fin base toward a fin tip at an angle from a plane normal to the outer surface that is greater than 0 and no more than 4 degrees.

In another embodiment according to any of the previous embodiments, the cast part comprises a heat exchanger plate that includes at least one plate portion with a top surface, a bottom surface and a plurality of cast cooling fins extending from both the top surface and the bottom surface and at least one of the first inner wall, the second inner wall and the third inner wall include a thickness not including localized surface features that is substantially constant between an inlet and an outlet of that at least four internal passages.

In another embodiment according to any of the previous embodiments, the heat exchanger plate is formed from one of a metal material and a nickel alloy material.

In another featured embodiment, a method of forming of directionally cast part includes assembling a core assembly to define an outermost wall, a first inner wall, second inner wall and a third inner wall defining at least four internal passages such that any cross-sectional circular area spanning at least a portion of each of said for internal passages includes a ratio of interior empty space to inner wall space that is greater than zero and no greater than 3.6. A mold core is formed including the core assembly and a gating portion. Molten material is introduced into the mold core. The molten material is directionally solidified. The core assembly is removed.

In another embodiment according to the previous embodiment, the molten material directionally solidified further includes forming a columnar grain structure in the completed cast heat exchanger plate.

In another embodiment according to the previous embodiment, the molten material directionally solidified further includes forming a single grain structure in the completed cast heat exchanger plate.

In another embodiment according to the previous embodiment, the core assembly is assembled to include features for defining at least one cast cooling fin extending from an outer surface such that the at least one cooling fin includes a ratio of fin height to an average fin thickness that is greater than 2.0 and no more than 18.0.

In another embodiment according to the previous embodiment, the cast part includes a cast heat exchanger plate including at least a first plate portion and a second plate portion and assembling the core assembly includes defining an open space separating the first plate portion from the second plate portion with the first plate portion including a first cast fin and the second plate portion including a second cast plate portion with at least one of the first fin portion and the second fin portion extending into the open space.

In another embodiment according to the previous embodiment, the core assembly is assembled to define a ratio of a first distance between outer surfaces of the first plate portion and the second plate portion bounding the open space and a second distance between a tip of one of the first fin portion and the second fin portion and the outer surface of the opposing one of the first plate portion and the second plate portion that is greater than 2.5 and no more than 4.5.

In another embodiment according to the previous embodiment, the core assembly is assembled to define at least one fin with a varying fin thickness in a direction from a fin base toward a fin tip at an angle from a plane normal to the outer surface that is greater than 0 and no more than 4 degrees.

In another embodiment according to the previous embodiment, the molten material directionally solidified includes forming at least one of the first inner wall, the second inner wall and the third inner wall without taper such that a thickness is substantially constant between an inlet and outlet of the at least four internal passages.

In another embodiment according to the previous embodiment, the molten material directionally solidified includes withdrawing the mold core from a molding furnace at a rate greater than 2 inches/hour.

In another embodiment according to the previous embodiment, the molten material directionally solidified includes withdrawing the mold core from a molding furnace at a rate greater than 9 inches/hour.

In another embodiment according to the previous embodiment, the molten material directionally solidified includes withdrawing the mold core from a molding furnace at a rate greater than 12 inches/hour.

In another embodiment according to the previous embodiment, the molten material directionally solidified includes withdrawing the mold core from a molding furnace at a constant rate from a start of solidification to an end of solidification.

In another embodiment according to the previous embodiment, the heat exchanger plate is formed from a nickel alloy material.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
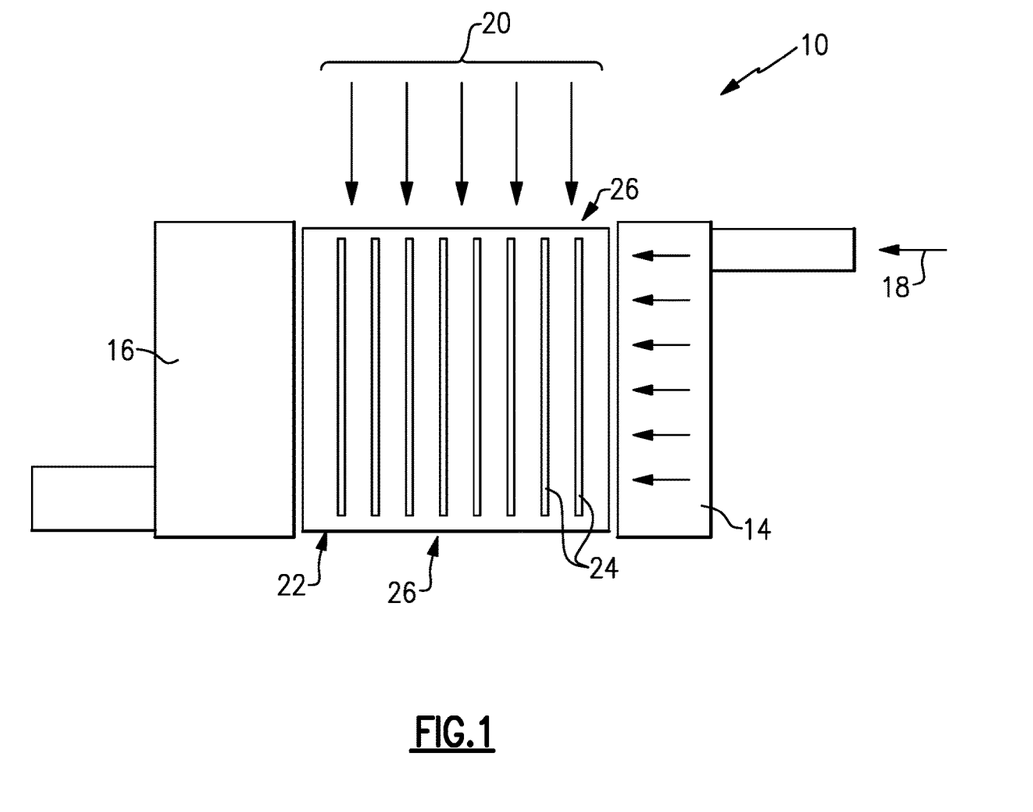
FIG. 1 is a perspective view of an example heat exchanger assembly.

Referring to FIG. 1 an example heat exchanger 10 includes a cast plate 12 that is attached at an inlet to an inlet manifold 14 and at an outlet to an outlet manifold 16. A hot flow 18 flows through the plate 12 and transfers thermal energy to a cooling airflow 20 flowing over outer surfaces of the cast plate 12. The hot air flow 18 flows through internal passages defined within plate portions 22. Open channels 26 are disposed between the plate portions 22 and receive the cooling airflow 20. Fins 24 extend from top and bottom surfaces of each of the plate portions 22. The top and bottom surfaces of some of the plate portions 22 bound the open spaces such that fins 24 extend into the open channels 26.

The fins 24 and plate portions 22 are portions of a single unitary cast structure that includes features providing thermal transfer between the hot flow 18 and the cooling air flow 20. The example cast plate 12 is cast as a single unitary part that provide increased thermal capabilities and to enable operation in extreme environments. The example cast plate 12 is formed from a metal material such as nickel alloy materials. Moreover, the cast plate 12 may be formed from other metal alloys as are known within the scope and contemplation of this disclosure.

Figure 2:
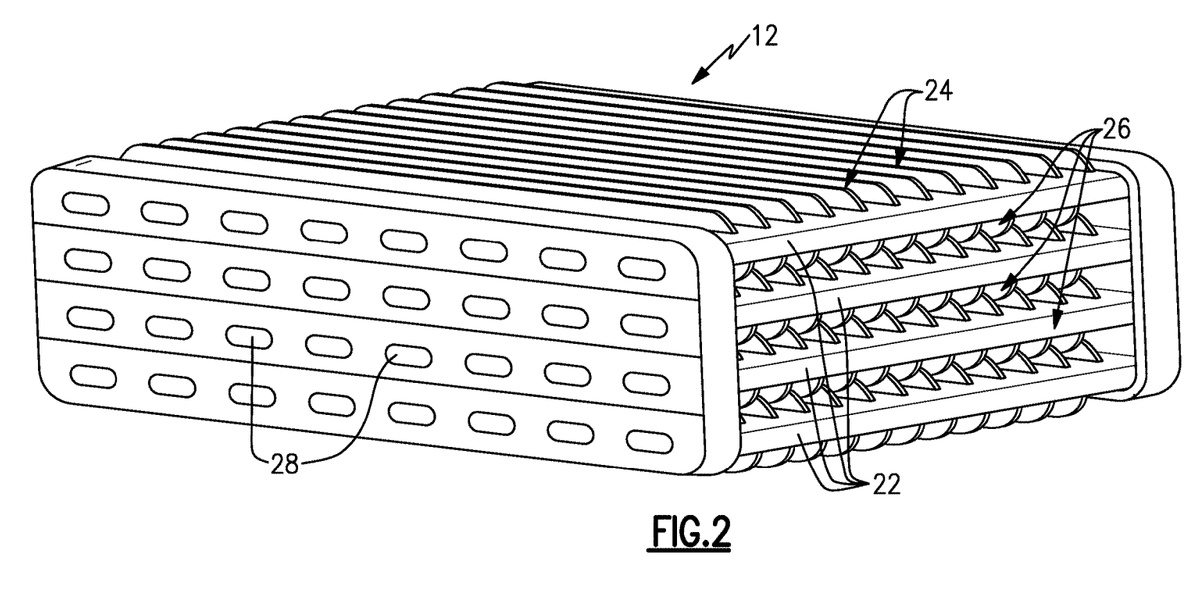
FIG. 2 is a perspective view of an example cast plate.

Referring to FIG. 2 with continued reference to FIG. 1, an example cast plate 12 is shown in a perspective view and includes a plurality of plate portions 12 that include internal passages 28. Each of the plate portions 22 includes a top surface 25 and a bottom surface 27 that include the fins 24. The fins 24 extend into open channels 26 between adjacent plate portions 22. The example plate 12 includes four plate portions 22 and three channels 26.

Figure 3:
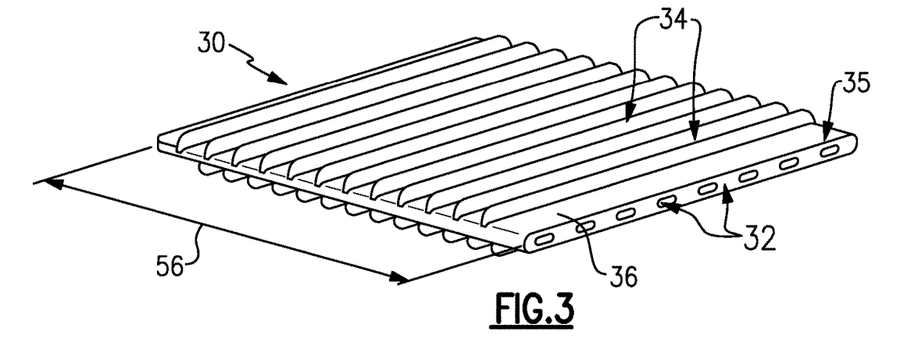
FIG. 3 is a perspective view of another cast plate.

Referring to FIG. 3 another cast plate 30 is illustrated and includes a single plate portion 36 and fin portions 34 extending from a top surface 35 and a bottom surface 37. A plurality of passages 32 are defined through the plate portion 36 and are in thermal transfer communication with the outer surface.

The plates 12 and 30 are disclosed by way of example to illustrate different configurations that are within the contemplation of this disclosure. A cast plate may include one plate portion 36 or many plate portions 22 with corresponding channels 26 there between to tailor the structure to application specific requirements. Each of the disclosed plates 12, 30 include similarly structured plate portions 22, 36 that provide thermal transfer.

The same features defined in the disclosed cast plates that enhance thermal transfer also present challenges in casting. The disclosed plates 12, 30 are formed utilizing directional solidification casting methods that enable the use of materials having superior mechanical properties. The example cast plates 12, 30 can be formed from materials including nickel alloy materials. Additionally, the use of directional solidification casting methods provides cast plates 12, 30 with favorable porosity properties as compared to other casting methods. Accordingly, the specific features of the disclosed cast plates are practically realized utilizing directional solidification casting methods.

Directional solidification casting methods supply molten material to a solidification front that is controlled. The solidification front is typically started at a lower most region of a part mounted to a chill plate. Solidification is controlled by moving the part from a heated region into a cooler region at a defined withdrawal rate to prompt solidification. Accordingly, rather than solidification occurring at all regions simultaneously as occurs in an equiaxed casting process, the directional solidification process provides for solidification to occur in a controlled manner along a defined front that moves through the part in a controlled direction and withdrawal rate.

The withdrawal rate is determined based on factors including the mass of the completed cast part, the specific configuration of cast features was well as materials utilized in the casting process. In one disclosed embodiment for a cast plate assembly including a plate 30 including a single plate portion 36 as shown in FIG. 3, the withdrawal rate is between 8 and 16 inches/hour. In other disclosed example embodiment for a cast plate assembly with two plate portions, the withdrawal rate is between 6 and 12 inches/hour. In still another example embodiment for a cast plate 12 as shown in FIG. 3, the withdrawal rate is between 2 and 8 inches/hour. The larger the mass of cast material that is required form the cast plate assembly, the slower the withdrawal rate. Moreover, although example withdrawal rates are disclosed by way example, other withdrawal rates according to the cast plate assembly construction and material could be utilized and are within the scope and contemplation of this disclosure.

Moreover, the example cast plates 12, 30 include a substantially uniform cross-section in a direction common with a direction that the plate is withdrawn from the heated region. The uniform cross-section enables the withdrawal rates to be constant for the entire solidification process. A changing cross-section may require various withdrawal rates due to the changing mass and curing requirements. The disclosed process and cast plate assemblies include uniform cross-sections that enable uniform and constant withdrawal rates.

Additionally, it should be appreciated that many different methods and processes fall with the directional solidification description including for example columnar grain casting and single crystal casting and are within the scope and contemplation of this disclosure.

Figure 4:
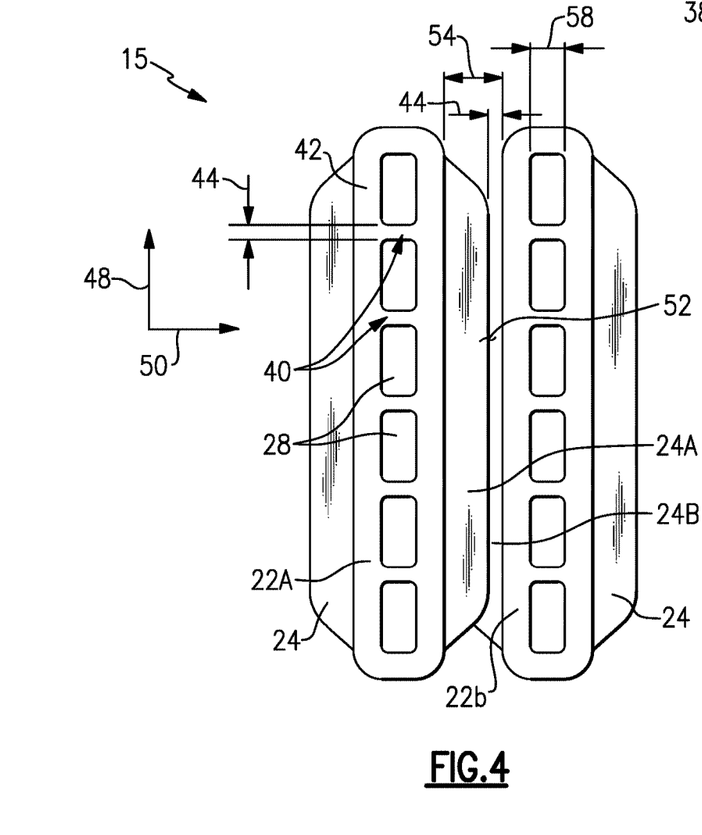
FIG. 4 is a schematic view of a portion of an example cast plate embodiment.
Figure 5:
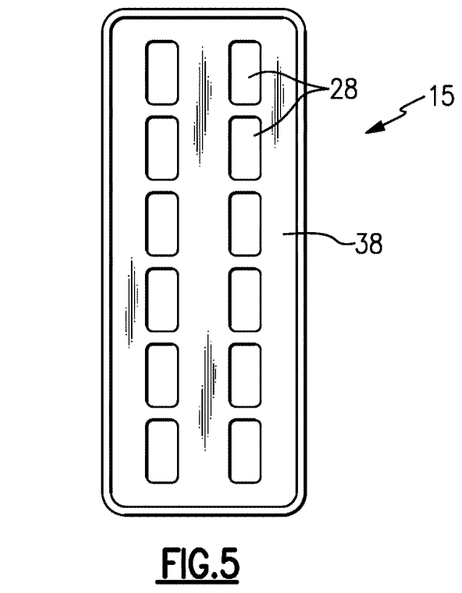
FIG. 5 is an end view of an example cast plate embodiment.
Figure 6:
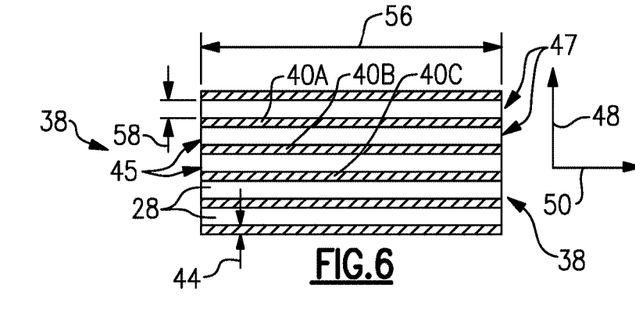
FIG. 6 is a schematic sectional view of a portion of an example cast plate embodiment.

Referring to FIGS. 4, 5 and 6 a portion of an example cast plate formed utilizing a directional solidification process is schematically indicated at 15. The directional solidification process enables features in the cast plate 15 that would not otherwise be available nor practical utilizing other molding and casting techniques.

In the disclosed example plate 25, a first plate portion 22A includes inner walls 40 with a thickness 44. In this example disclosed embodiment, the walls include a first inner wall 40A, a second inner wall 40B and a third inner wall 40c. The thickness 44 is in a direction 48 that is common with a direction of solidification of the plate portion 22. Moreover, the walls 40 extend from an inlet 45 to an outlet 47 (FIG. 5). The thickness 44 is substantially uniform for a length 56 of each passage 28 between a corresponding inlet 45 and outlet 47. The disclosed example thickness 44 is determined without regard to localized heat transfer features (not show) that may be provided on internal surfaces of the passages 28.

The example illustrated in FIG. 4 includes the first plate portion 22A and a second plate portion 22B and an open space 52 there between. The plate portions 22A and 22B are spaced apart a distance 54 of the open space 52. The distance 54 is disposed in the second direction 50 that is transverse to the first direction 48.

Referring to FIG. 5, the example cast plate 15 includes an end face 38 that provides for each of the passages 28 to open to an outer surface within a common plane. An open face 38 is disposed on either side of the plate 25 and includes the inlets 45 and the outlets 47 for the plurality of passages 28.

Figure 7:
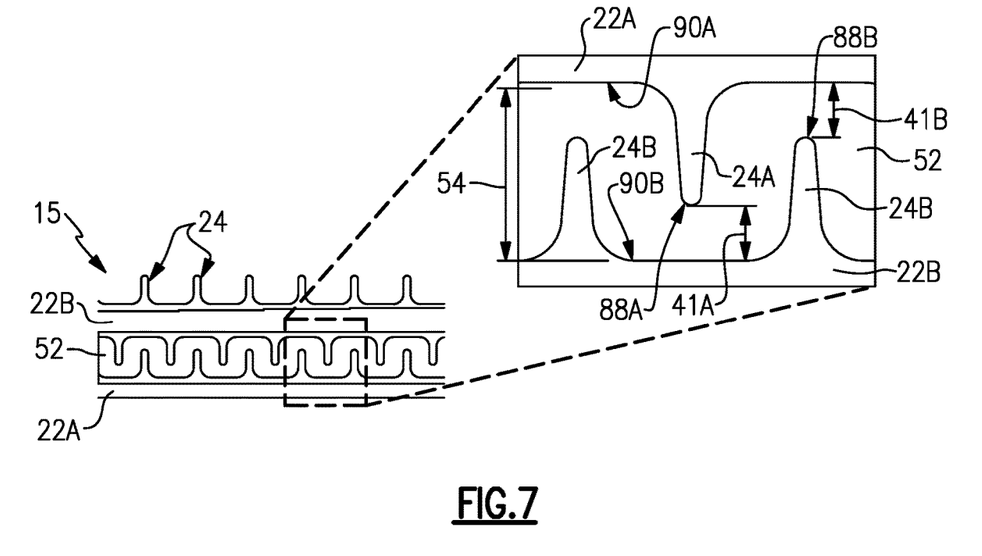
FIG. 7 is a cross-sectional view of a portion of an example cast plate embodiment.
Figure 8:
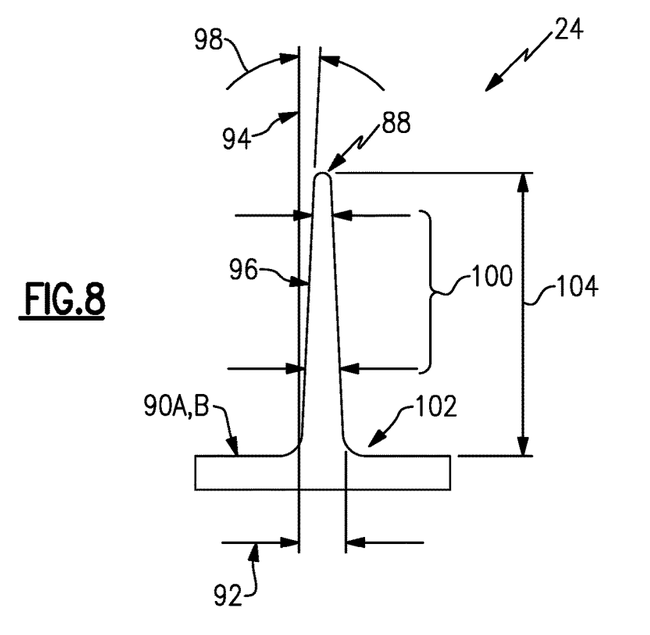
FIG. 8 is a cross-section of an example fin portion.

Referring to FIG. 7 with continued reference to FIG. 4, in each of the disclosed embodiments, the plate portions 22A and 22B include fin portions 24 that extend outwardly. The fin portions 24 provide for directing of a cooling airflow over outer surfaces and also increases surface area to provide additional thermal transfer. The fins 24 extend from corresponding outer surfaces 90A, 90B within the open space 52 between the plate portions 22A, 22B. In one disclosed embodiment, a first fin portion 24A extends from the first plate portion 22A towards the second plate portion 22B. A second fin portion 24B extends from the second plate portion 22B towards the first plate portion 22A such that each of the fins 24A, 24B overlap.

The open spaces 52 are bounded between the outer surfaces 90A, 90B that are spaced the first distance 54 apart. A tip 88 of at least one of the first fin portion 24A and a second fin portion 24 B is spaced a second distance 41 from the opposing outer surfaces 90A, 90B. In the disclosed example, the first fin portion 24A includes the tip 88A that is spaced a second distance 41A from the outer surface 90B. Similarly, the fin portion 24B includes tip 88B that is spaced a second distance 44B. In this example, the second distance 41A and 41B are the same, however, it is within the scope and contemplation of this disclosure that the second distance may differ. In this example, a ratio of the first distance 54 to either of the second distances 41A, 41B is greater than 2.5 and no more than 4.5. In another example embodiment the ratio between the first distance 54 and either of the second distances 41A, 41B is greater than 3.25 and no more than 3.75.

Referring to FIG. 7, a fin portion 24 is shown and is a cast part of the cast plate and extends a height 104 from the outer surfaces 90 A, B. It should be understood, that fin portions 24 extend from outer surfaces of the disclosed plate portions and the example fin portion 24 is disclosed and shown by way of example. Moreover, the specific shape is shown by way of example and may be of different shapes. In this example, the fin portion 24 includes a base 102 and tip 88. A thickness 100 varies in a decreasing manner in a direction from the base 102 toward the tip 88. In this example, a side 96 of the fin portion 24 is tapered according to an angle 98 relative to a plane 94 normal to the outer surface 90A, B. In one disclosed example, the angle 98 is greater than zero and no more than 4 degrees.

The fin portion 24 provides for the transfer of thermal energy to the cooling airflow. The example fin portion 24 includes a height and thickness that enables efficient thermal transfer. In this example a ratio of the height 104 to an average thickness 92 is greater than 2.0 and no more than 18.0. In another disclosed example, the ratio of the height 104 to the average thickness 92 is greater than 3.5 and no more than 12.0. The example ratio is provided to illustrate that the scale of the plates and features of the plate such as the fin portions 24 are scalable in size and maintain the disclosed relationships to provide predefined thermal and mechanical properties.

Figure 9:
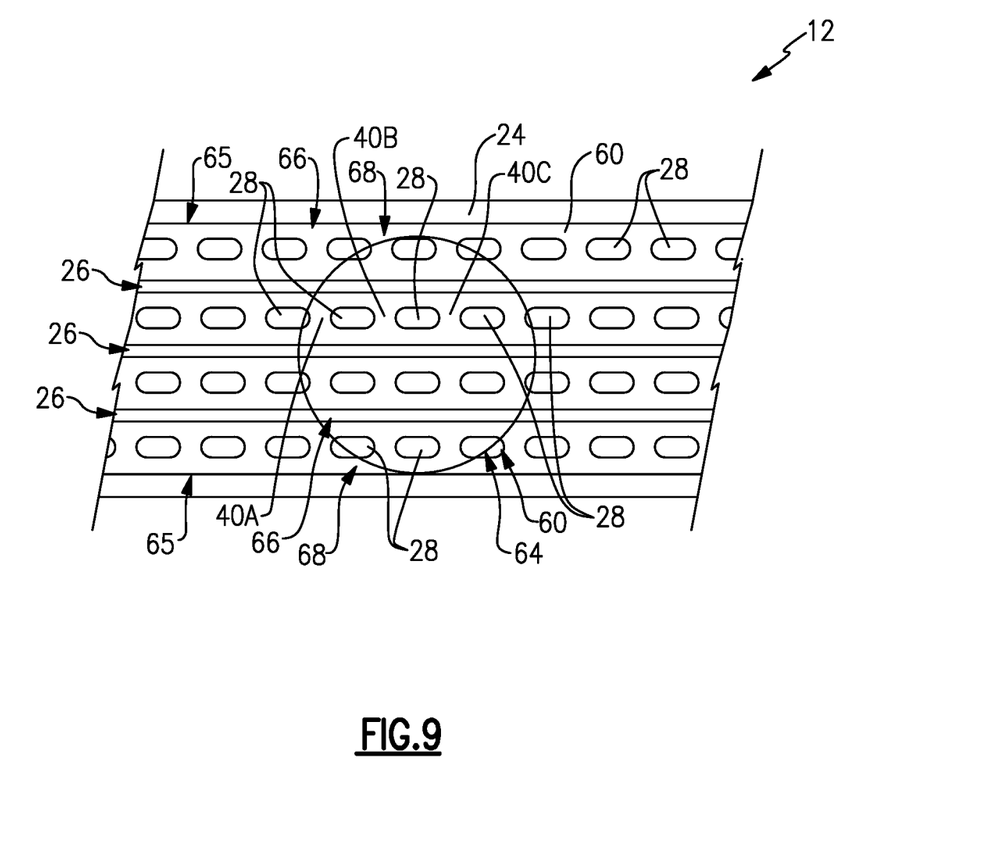
FIG. 9 is a cross-sectional view of a portion of a cast plate embodiment including multiple plate portions.

Referring to FIG. 9, with continued reference to FIG. 6, the cast plate assembly 12 is cast in such a way as to enable a ratio between open areas or empty spaces and cast material filled areas within a given circular area 64 that provides desired thermal transfer properties. The area within the circular area 64 is indicative of properties throughout the disclosed heat exchangers that enable improved thermal efficiencies. In one disclosed example embodiment, the first inner wall 40a, the second inner wall 40b and the third inner wall 40c define at least four internal passages 28 and any cross-sectional circular area 64 spanning at least a portion of each of four internal passages includes a ratio of interior empty space to inner wall space that is greater than zero and no greater than 3.6.

The first, second and third inner walls 40a, 40b and 40c are not part of any outermost walls 65. The passages 28 encompass a plurality of empty spaces 68. The outermost walls 65 are those walls that include a portion that define an external surface of the cast part. The inner walls 40a, 40b and 40c are those walls that define the spacing between internal passages, but not portions of an external surface.

Figure 10:
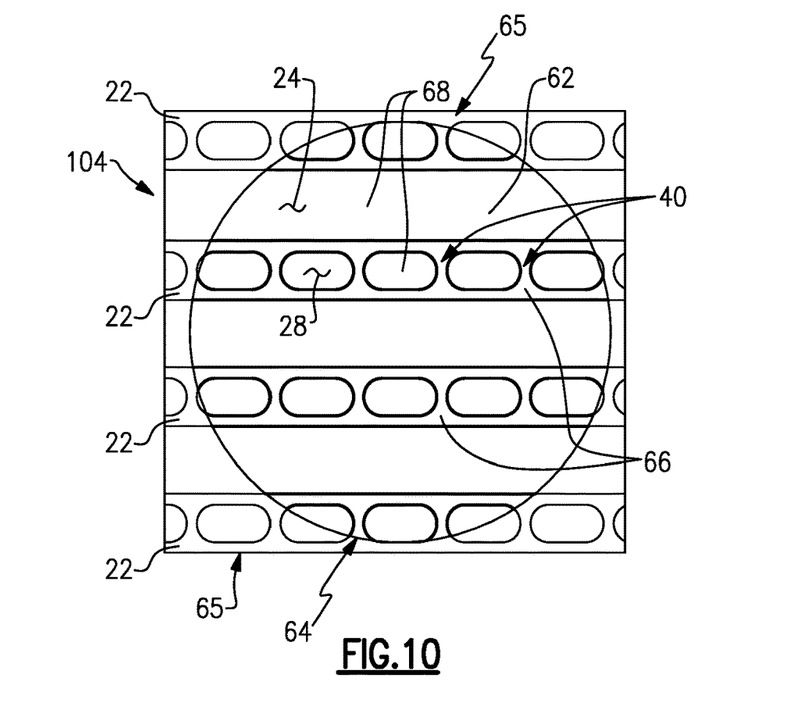
FIG. 10 is an enlarged cross-sectional view of a portion of a cast plate embodiment including multiple plate portions.

Referring to FIG. 10 with continued reference to FIG. 9, in another disclosed embodiment, the circular area 64 includes a ratio of empty space 68 to cast material 66 that is greater than zero and no more than 3.6. In another disclosed embodiment, the ratio or empty space 68 to cast material 66 is greater than zero and no more than 2.0. In this example, the disclosed cross-section is of a plate assembly includes multiple plate portions 22. Each plate portion includes passages 28 and fin portions 24. The recited ratio holds for any circular area 64 defined within the outermost walls 65 and includes only the internal walls 40. The disclosed cross-section is taken in a plane parallel in a direction common with the cooling fins 24 and the direction of cooling flow over the surfaces of the plate portions 22. The outer most walls 65 are within the corresponding topmost and bottommost plate portions 22 and includes the open spaces 52 between intermediate plate portions.

Figure 11:
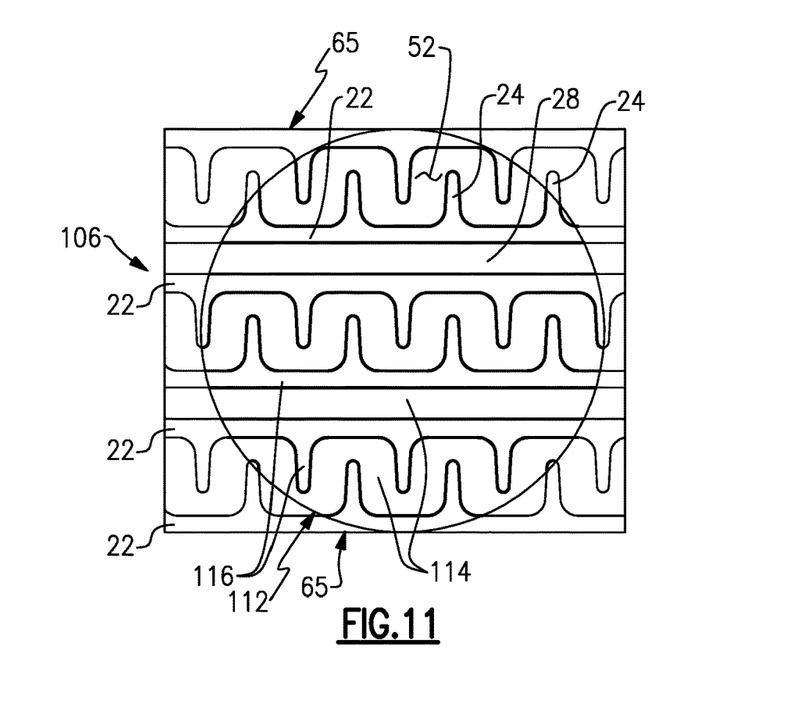
FIG. 11 is another enlarged cross-sectional view of a portion of a cast plate embodiment including multiple plate portions.

Referring to FIG. 11, with continued reference to FIGS. 9 and 10, another cross-section 106 is shown with another circular area 112 defined between outermost walls 65. In this example, the outer most walls are defined as disclosed in FIG. 10 between outermost walls of the topmost and bottom most plate portions 22. The circular area is a cross-section taken transverse to the fin portions 24 and the direction of cooling airflow through the cooling spaces 52. In other words, the cross-section 106 is taken in a plane extending in a direction common with the passages 28 and the hot flow. The circular area 112 includes empty spaces 114 and cast material areas 116. The empty spaces 114 include portions of passages 28 and the open space 52 within the circular area 112. In one disclosed embodiment, a ratio of empty space 114 to cast material 116 is greater than 0.85 and 1.75. In another disclosed embodiment the ratio of empty space 114 to cast material 116 is between 1.0 and 1.50.

Figure 12:
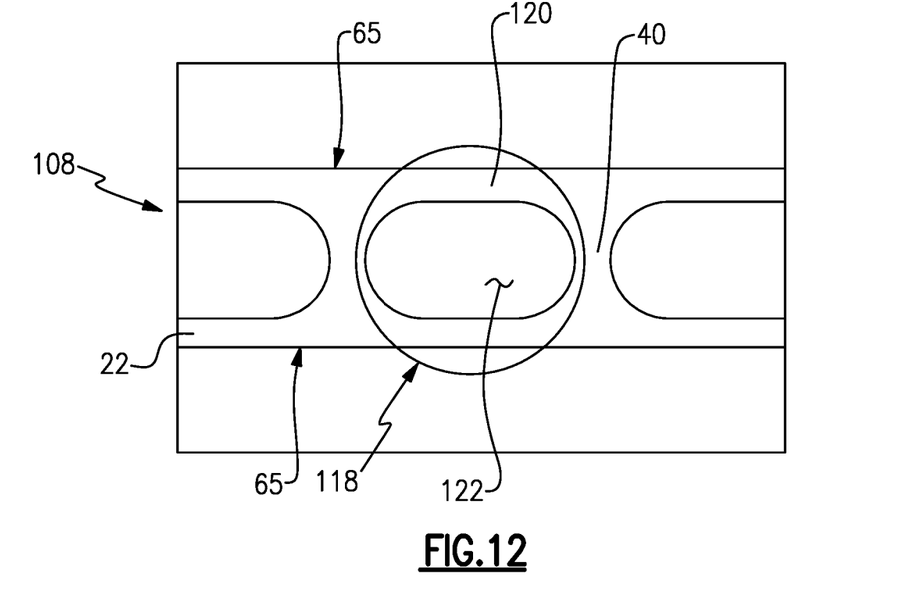
FIG. 12 is another enlarged cross-sectional view of a portion of a single plate portion.

Referring to FIG. 12, with continued reference to FIGS. 9 and 10, another cross-section 108 is schematically shown and includes a circular area 118 within the outermost walls of a single plate portion 22. The cross-section is taken through the plate portion 22 within a plane extending in a direction the same as the fin portions 24. The circular area 118 includes empty spaces 122 corresponding to the passages 28 and cast material 120 that corresponds to the walls including portions of the outermost walls 65 and the inner walls 40. A ratio of empty spaces 122 to cast material 120 within the circular area 118 is greater than 1.50 and no more than 2.00. In another disclosed embodiment, the ratio between empty spaces 122 and cast material 120 is greater than 1.66 and no more than 1.95.

Figure 13:
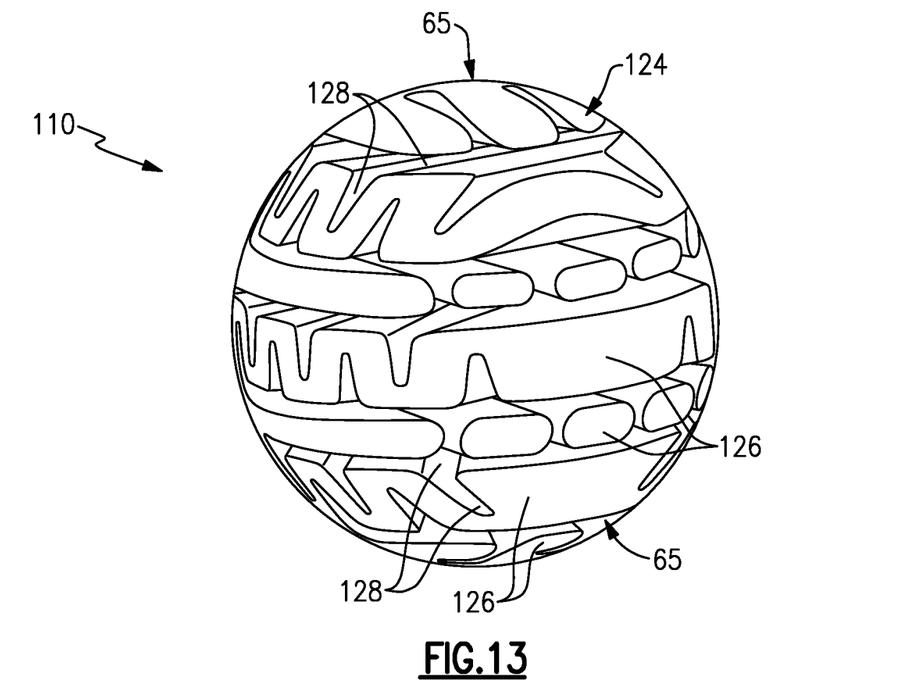
FIG. 13 is a spherical view of a volume of a cast plate embodiment including multiple plate portions.

Referring to FIG. 13, a volume 110 within the outermost walls 65 of a cast plate having multiple plate portions is schematically shown. The volume 110 includes empty volumes 126 and filled volume 128. The empty spaces 126 include those spaces defined by the passages 28 and spaces 52. The filled volume 128 includes the features filled with cast material including the inner walls 40 and fin portions 22 as well as other walls that define the plate portion. The volume 110 includes a ratio of empty volume 126 to filled volume 128 that is greater than zero and no more than 2.10. The disclosed ratio of empty volume 126 to cast filled volume 128 enables the heat transfer capabilities of the example cast plate. The heat transfer capabilities are enabled by the balance of open spaces for hot and cold flows and the cast structures that transfer heat between the flows. The disclosed volume 110 may be located at any position within the outermost walls of a cast plate including multiple plate portions. The disclosed ratio is provided to enable scaling of size to accommodate application specific requirements.

Figure 14:
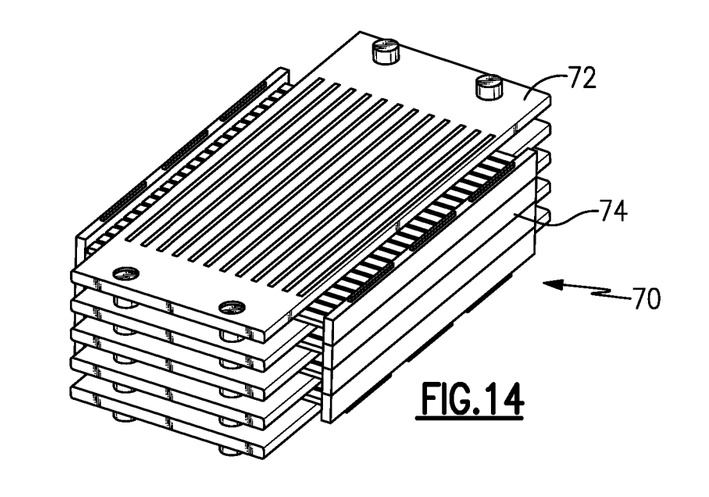
FIG. 14 is a perspective view of an example core assembly.

Referring to FIG. 14, the features of the plate portions 22 are defined at least partially by a core assembly 70. In this disclosed example, the core assembly 70 includes cold plate portions 72 that are stacked in alternating fashion with hot plate portions 74. The hot plate portions 74 define the plurality of passages 28 that extend through the plate portions 22 of a finished cast plate 12. The cold plate portions 72 define external surfaces including the fins 24 and cooling channels 26 disposed between plate portions 22 of a completed cast plate 12.

Figure 15:
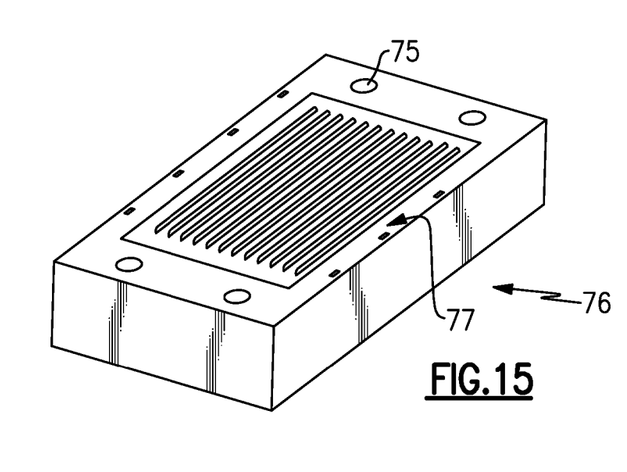
FIG. 15 is a perspective view of an example wax pattern.

Referring to FIG. 15 with continued reference to FIG. 14, a wax pattern 76 is formed about the core assembly 70 and provides for the locking of an orientation between the plates 72 and 74. In one disclosed embodiment, the wax pattern 76 fills features and/or locks into portions of the cold plates 72 and hot plates 74 to lock an orientation between plates. In this example a portion of the cold plate indicated at 75 extends through the wax pattern 76 and a portion 77 of the hot plate 74 is filled with wax.

Figure 16:
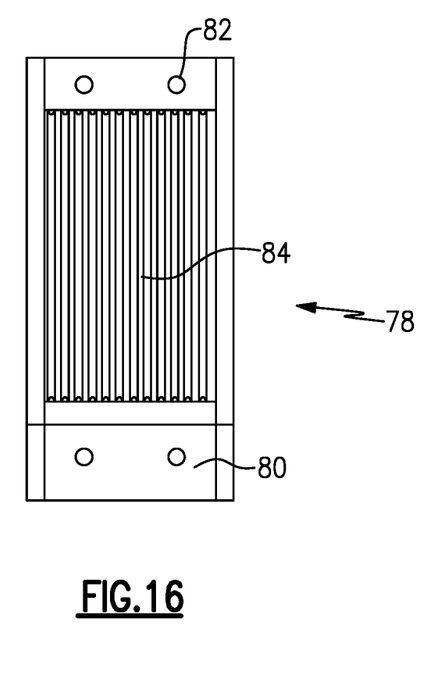
FIG. 16 is a front view of an example mold core.

Referring to FIG. 16 with continued reference to FIG. 15, once the wax pattern 76 has been formed a mold core 78 is made from the wax pattern 76. The mold core 78 is fabricated by coating the wax pattern 76 with a desired thickness of a metallic material capable of withstanding molten temperatures of material utilized for forming the cast plate assembly. The mold core 78 includes features that define augmentation features 84 on outer surfaces of a completed cast plate. In this example, the mold core 78 also includes features that define a lower gating 80 and an upper gating 82. The upper gating 82 and the lower gating 80 are utilized to introduce molten material in a directional manner as desired to form the example cast plate assembly.

Figure 17:
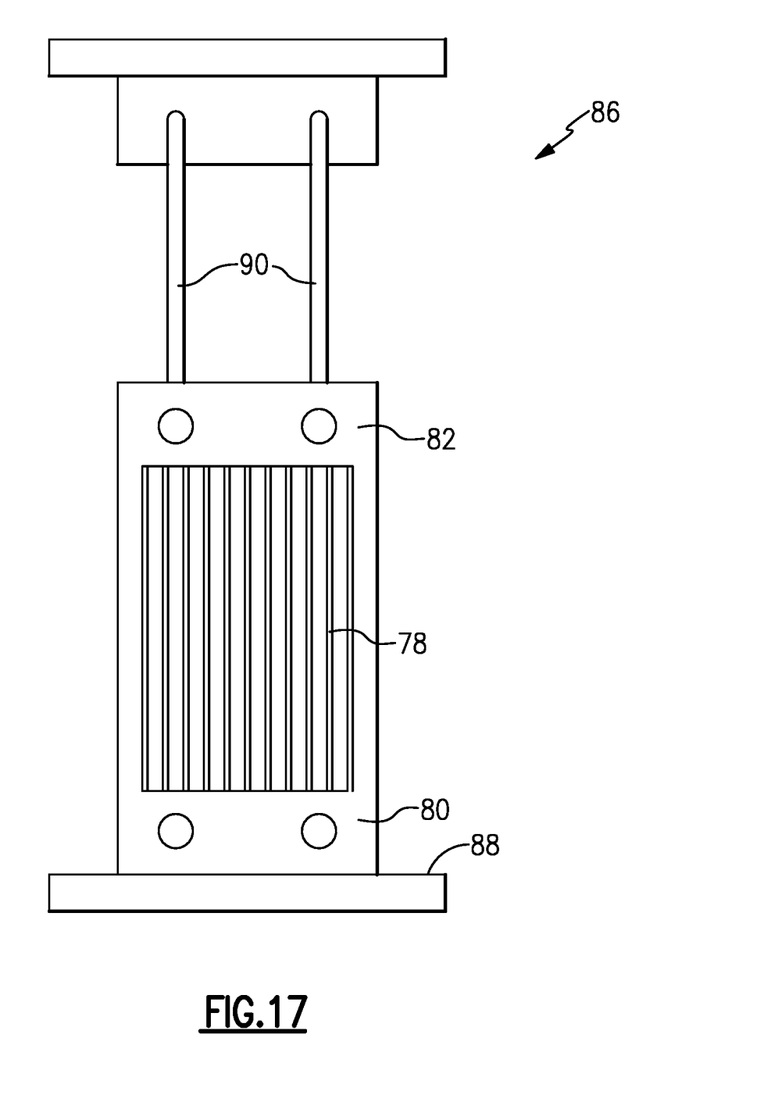
FIG. 17 is a perspective view of an example molding machine.

Referring to FIG. 17, an example molding device 86 is disclosed and includes a chill plate 88 that supports a plurality of mold cores 78. Each of the mold cores 78 includes a lower gating 80 that is mounted onto the chill plate 88. An upper gate 78 is placed in communication with channels 90 for molten material.

The molding machine 86 utilizes the mold cores 78 to provide the desired directional solidification of material through the mold cores 78. As appreciated, the directional solidification molding provides for the constant maintenance of molten material at a solidification front in a manner that enables consistent material properties throughout the entire casting process. Moreover, the directional solidification process can include the formation of a columnar grain structure or a single crystal structure. The directional solidification casting method enables the cast plate to be formed with the ratios between wall thicknesses and open spaces disclosed above. Other molding processes have limitations that would not enable the relationships between structures of the disclosed cast plate.

The example cast plate 12 and method of forming the cast plate 12 enables creation with low porosity while also including thin wall sections that provide enhanced thermal transfer capabilities at high pressures. Moreover, the directional solidification process enables the reduction or the elimination of drafting of each of the passages that is required when other casting methods are utilized. Additionally, the directional solidification process enables the formation of grain structures that provide improved mechanical properties. For example, the cast plate 12 maybe formed with a columnar grain structure or a single crystal grain structure. Accordingly, the disclosed cast plate and method of forming the caste plate using directional solidification casting methods provides for the practical creation of heat exchangers with enhanced performance and thermal transfer capabilities.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A cast part comprising:
an outermost wall; and
a first inner wall, a second inner wall, and a third inner wall which define at least four internal passages, wherein any cross-sectional circular area spanning at least a portion of each of said four internal passages includes a ratio of interior empty space to inner wall space that is greater than zero and no greater than 3.6.

2. The cast part as recited in claim 1, including at least one cast cooling fin, wherein the cooling fin includes a ratio of fin height to an average fin thickness that is greater than 2.0 and no more than 18.0.

3. The cast part as recited in claim 1, including at least a first plate portion separated by an open space from a second plate portion, wherein the first plate portion includes at least one first cast fin portion extending into the open space and the second plate portion include at least one second cast cooling fin extending into the open space.

4. The cast part as recited in claim 3, wherein a ratio of a first distance between outer surfaces of the first plate portion and the second plate portion bounding the open space and a second distance between a tip of at least one of the first cast fin portion and the second cast fin portion and an opposing outer surface is greater than 2.5 and no more than 4.5.

5. The cast part as recited in claim 1, including at least one cast fin portion including a fin thickness that varies in a direction from a fin base toward a fin tip at an angle from a plane normal to an outer surface that is greater than 0 and no more than 4 degrees.

6. The cast part as recited in claim 1, wherein the cast part comprises a heat exchanger plate that includes at least one plate portion with a top surface, a bottom surface and a plurality of cast cooling fins extending from both the top surface and the bottom surface and at least one of the first inner wall, the second inner wall and the third inner wall include a thickness not including localized surface features that is substantially constant between an inlet and an outlet of that at least four internal passages.

7. The cast part as recited in claim 1, wherein the cast part is formed from one of a metal material and a nickel alloy material.

8. A heat exchanger comprising:

an inlet manifold;

an outlet manifold; and at least one plate portion disposed between the inlet manifold and the outlet manifold, the at least one plate portion having a top surface, a bottom surface and a plurality of cast cooling fins extending from both the top surface and the bottom surface, wherein the at least one plate portion includes an outermost wall, a first inner wall, a second inner wall, and a third inner wall which define at least four internal passages, wherein any cross-sectional circular area spanning a portion of all of said four internal passages includes a ratio of interior empty space to inner wall space that is greater than zero and no greater than 3.6 and wherein the at least one plate portion comprises a single unitary structure.

9. The heat exchanger as recited in claim 8, wherein the at least one plate portion comprises a first plate portion and a second plate portion separated from the first plate portion by an open space.

10. The heat exchanger as recited in claim 9, wherein each of the first plate portion and the second plate portion include at least one first cast fin portion extending into the open space.

11. The heat exchanger as recited in claim 10, wherein a ratio of a first distance between outer surfaces of the first plate portion and the second plate portion bounding the open space and a second distance between a tip of at least one of the first cast fin portion and the second cast fin portion and an opposing outer surface is greater than 2.5 and no more than 4.5.

* * * * *